April 29, 1958  D. M. EVANS  2,832,461
TURRET APPARATUS FOR POWER WASHING EQUIPMENT
Filed May 28, 1956  3 Sheets-Sheet 1
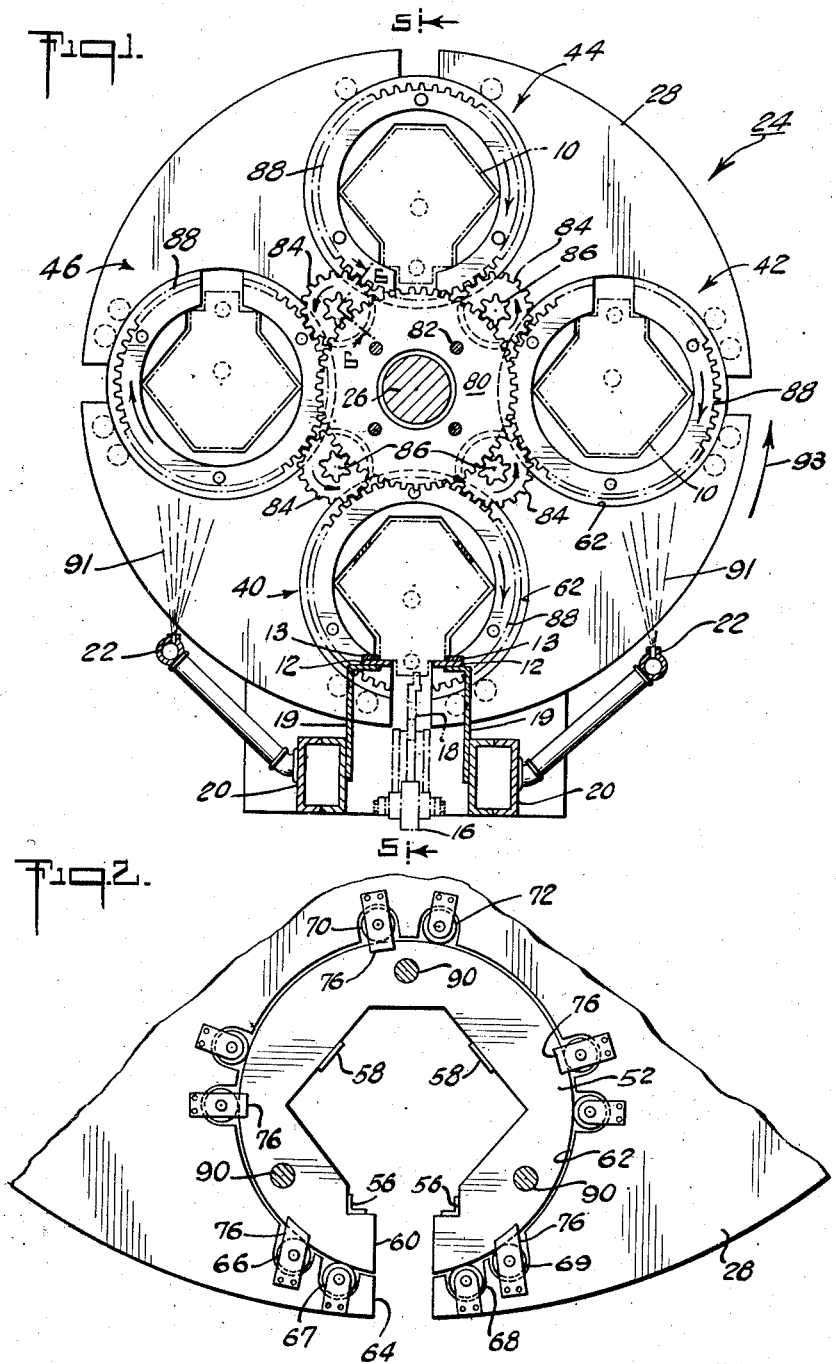
INVENTOR:
DEWEY M. EVANS.
BY
ATTORNEYS.

April 29, 1958  D. M. EVANS  2,832,461
TURRET APPARATUS FOR POWER WASHING EQUIPMENT
Filed May 28, 1956  3 Sheets-Sheet 2
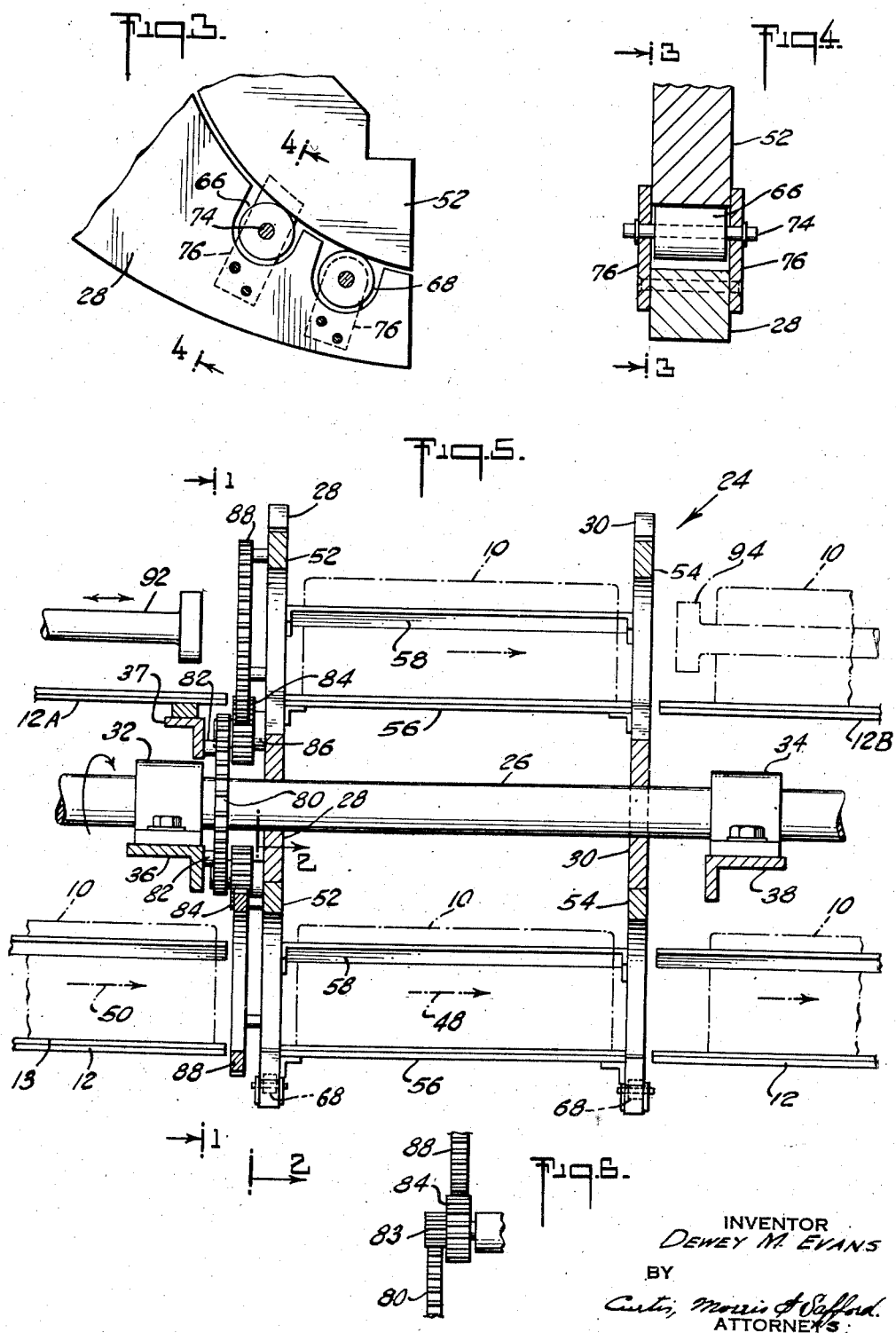
INVENTOR
DEWEY M. EVANS
BY
ATTORNEYS April 29, 1958  D. M. EVANS  2,832,461
TURRET APPARATUS FOR POWER WASHING EQUIPMENT
Filed May 28, 1956  3 Sheets-Sheet 3
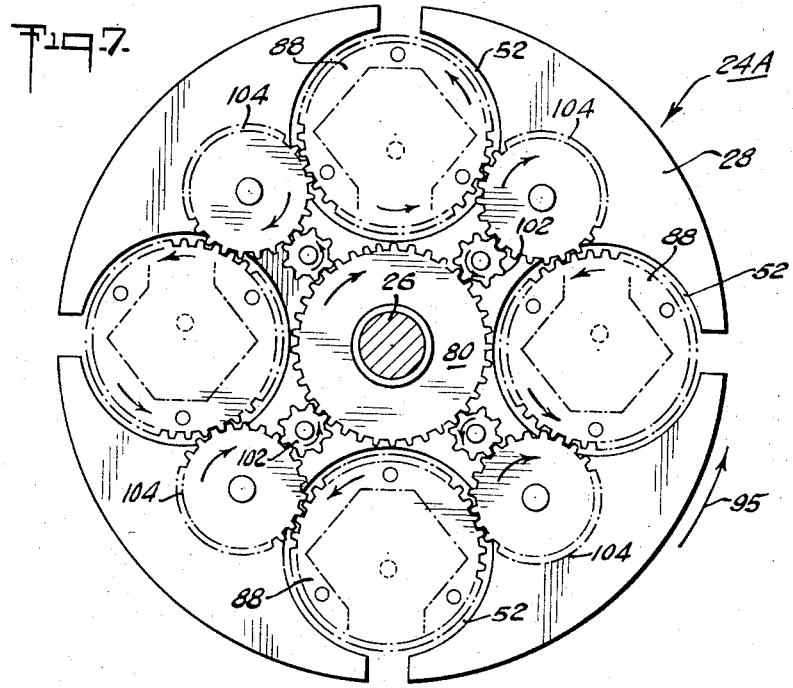
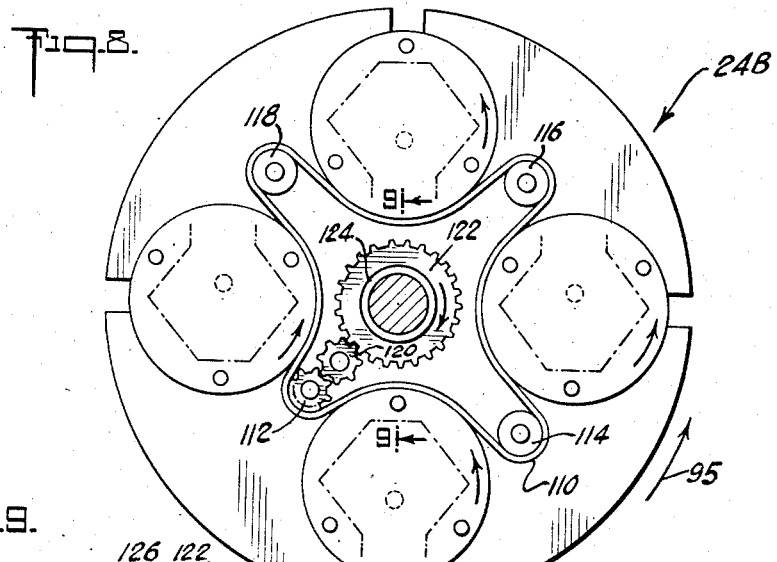
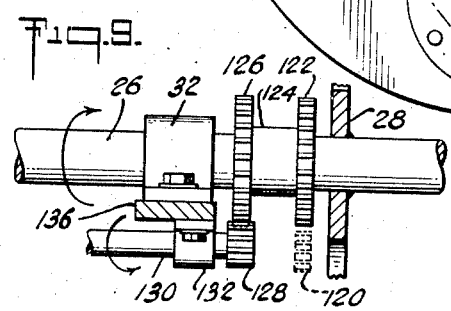
INVENTOR
DEWEY M. EVANS.
BY
Curtis, Morris & Safford
ATTORNEYS

United States Patent Office 2,832,461
Patented Apr. 29, 1958

2,832,461

TURRET APPARATUS FOR POWER WASHING EQUIPMENT

Dewey M. Evans, Plymouth, Mich., assignor to Ajem Laboratories, Inc., Livonia, Mich., a corporation of Michigan Application May 28, 1956, Serial No. 587,724

14 Claims. (Cl. 198—33)

The present invention relates to improved turret apparatus for power washing equipment adapted for use in industrial applications for cleaning various manufactured articles. This invention enables a manufacturing concern to obtain automatic highly effective washing under high pressure of both the outside and inside of manufactured metal parts or assemblies and is well suited for handling a wide variety of manufactured articles. In the illustrative embodiment of this invention described herein the improved turret apparatus is arranged to handle automobile engine blocks. This invention is in the nature of an improvement over the type of apparatus described in application Serial No. 467,746, filed November 9, 1954 in the names of Emil Umbricht and myself.

It is an object of the present invention to provide an improved turret apparatus for use in industrial power washing equipment wherein the articles being handled can be rotated at least twice around their own axes while being revolved around the main axis of the turret, thus assuring a more complete internal and external flushing and drying off of the articles and an improved action in dumping out any solid particles or liquid from the internal passages and openings in the article. This improved turret apparatus is particularly well suited for use in automotive and other mass production industries involving the manufacture of relatively complicated and intricate articles.

In many mass-producing type industrial applications involving the fabrication of complicated machine parts and assemblies, it is necessary at one or more points in the production schedule to remove the various soils or other foreign materials which adhere to both outside and inside of the manufactured articles. These soil materials accumulate as a result of the previous manufacturing steps and, for example, often include molding sand, metal chips and particles, combined with films of cutting oils and greases and coolants used during the machining operations.

To assure the high degree of effective cleaning required in such close tolerance machinery as represented by a modern automobile engine, there has been a continuing search for ever improved automatic washing apparatus. The present invention overcomes in a large measure the limitations of prior equipment and further increases the efficiency and effectiveness of automatic washing operations. This improved turret apparatus is particularly helpful in assuring thorough cleansing of the intricate internal passages and openings in engine blocks and the like as well as thoroughly cleansing their external surfaces.

In modern machinery the parts are complex and are held to close tolerances so that the presence of only slight amounts of soil materials quickly causes damage by corrosion and scouring action when the equipment is assembled and run. For example, in the automobile industry there have been vast increases in horsepower, engine speed and performance. Automobile engine blocks and similar castings are much more complex than heretofore. V and Y blocks are commonly used. With such power, speed and complexity, the complete effective washing of the engine block prior to assembly has become one of the key steps in the production line. These blocks include numerous intricate passages for accommodating the hydraulic valve lift systems and oil circulation and various moving parts. One of the problems is the tendency for the engine block to retain dirt and liquid in these passages. The improved turret apparatus described herein as an illustrative embodiment of my invention is highly effective in cleaning out and thoroughly drying these internal passages.

This improved turret apparatus is adapted for incorporation in the type of machine described in the above-identified application. In that machine the manufactured articles to be cleaned, for example, automobile engine blocks, are carried one behind another along a track through the power washing machine. Positioned along this track are a number of different stations at which specific washing and cleaning operations are carried on. The engine blocks are advanced intermittently from station to station pausing briefly at each station while particular washing or drying operations are carried on. At one or more stations along this track are located turret assemblies into which the engine blocks are loaded. The turret assembly revolves them up and around the axis of the turret. The blocks are lifted from the track and swung through a number of angular positions where high pressure sprays of cleaning liquid or blasts of drying air are directed on them as they are revolved completely over and lowered down onto the track again.

Among the advantages of this improved turret apparatus are those resulting from the fact that the articles being washed are turned around their individual axes at least twice before being moved along further in the machine. In this way, the surfaces of the article being washed can be thoroughly sprayed with washing liquid or dried off with blasts of air, as the case may be. The soil material or liquid in the internal passages of the engine blocks or other articles has an opportunity to tumble out at least twice during the revolution of the article around the axis of the turret. This assures that the inside of the article is completely cleansed and dried. The use of this improved turret apparatus enables the saving of substantial time in cleaning each article, resulting in improved efficiency in the overall production line, for it effectively produces a more concentrated cleaning and drying action in the same length of time.

Another advantage of this improved turret assembly is that the blocks or other articles are held inverted at positions during the revolution of the turret where they are displaced laterally from the axis of the turret. Thus, the blocks are much more readily accessible for being flushed out and dried by jets of liquid or air directed up from underneath the block. Moreover, the blocks pause in these accessible inverted positions so that the cleaning and drying jets are precisely directed at the various internal and external surfaces for most effective washing and drying action.

A further advantage of this improved turret apparatus is its adaptability for receiving articles at one elevation and for delivering the articles at a different elevation with their original or a new orientation. In many production lines it is desired to change the elevation and/or orientation of the article being handled. This desired flexibility is provided by the present invention.

The various aspects, features, objects, and advantages of the present invention will be more fully understood from a consideration of the following description in conjunction with the accompanying three sheets of drawings, in which:

Figure 1 is a cross sectional view taken along the line 1—1 in Figure 5 looking toward the right and showing the main axle of the turret assembly in section and illustrating the improved turret apparatus itself in elevation with the relative positions of four automobile engine blocks schematically illustrated in the turret;

Figure 2 is a sectional view taken along the line 2—2 in Figure 5 looking toward the right and showing on enlarged scale, an end view of one of the four cradles in the turret;

Figure 3 is an enlarged view of a portion of Figure 2 showing a pair of the individual cradle supporting rollers;

Figure 4 is a sectional view showing one of the rollers of Figure 3 being taken along the line 4—4 in Figure 3;

Figure 5 is an axial sectional view taken generally along the line 5—5 in Figure 1 looking toward the left, with certain parts omitted for clarity;

Figure 6 is a partial sectional view on enlarged scale taken along the broken line 6—6 of Figure 1 looking generally toward the right and showing one of the compound idler gears in greater detail;

Figure 7 is a somewhat schematic cross sectional view similar to that of Figure 1 and showing another illustrative embodiment of the present invention;

Figure 8 is a cross sectional view similar to that of Figure 1 and showing a further illustrative embodiment of the present invention; and Figure 9 is a partial axial sectional view taken along the line 9—9 of Figure 8 looking to the left.

The improved turret is described as being used in a washing station. It may also be used to advantage in a rinsing or drying station. In operation, the articles being washed, which are here described as automobile engine blocks 10, schematically indicated by the dash and dot rectangles, are advanced from the left, as shown in Figure 5, along a track 12. As shown in Figure 1 the track 12 includes two rails to the left and right of the center line of the machine. Each rail includes a guide flange 13 extending along beside the pan rail of the engine block and also a ledge which extends under the pan rail thus accurately supporting and guiding each block. The blocks are moved along the track 12 by means of a suitable transfer mechanism 16, shown dotted, and described in detail and claimed in the above copending application. This transfer mechanism includes dogs 18 that extend up and engage the rear bearing cap or the rear edge of the pan rail so as to slide the blocks 10 along the track 12.

These tracks 12 are supported by brackets 19 from the main frame members 20 of the machine. The members 20 are hollow and also serve as manifolds advantageously conducting the high pressure fluid to the spray nozzle assemblies, such as those indicated at 22, positioned around the periphery of the improved turret, generally indicated at 24.

As indicated in Figure 1, it is an advantage of this improved turret that the nozzles, such as those at 22, are enabled to direct their sprays unobstructed upwardly at the engine blocks 10 when the blocks are held in inverted positions on opposite sides of the main shaft 26 of the turret assembly 24. It will be understood that a washing station, such as illustrated, includes many other nozzles similar to those shown at 22 and positioned at various points of vantage around the turret assembly 24. These other nozzles are directed so as to provide the most effective angles of impingement of the high pressure jets on the outer and inner surfaces of the engine blocks 10 to obtain the best cleaning action. These other spray nozzles are omitted from the drawing for simplification to emphasize more clearly the features of the present invention.

The improved turret assembly includes (see Figure 5) front and rear end plates 28 and 30, respectively, welded to the main shaft 26. These end plates 28 and 30 are spaced apart a distance slightly greater than the length of the engine blocks 10 being cleaned. Supporting the main shaft 26 at either end of the turret assembly 24 are a pair of bearings 32 and 34 secured to transverse brackets 36 and 38 extending across above the path of the blocks on the track 12. The shaft 26 is indexed around by a suitable source of torque, for example, such as one of the hydraulic torque motors disclosed and claimed in the copending applications Serial Nos. 462,726 filed October 18, 1954, and 476,138 filed December 20, 1954.

The shaft 26 is arranged to rotate a quarter of a turn during the time the blocks 10 are stationary on the tracks 12, pausing so as to position one of the four cradles 40, 42, 44, or 46 in line with the track 12. While the turret assembly remains stationary in this position the block 10 on the cradle 40 in the bottom position is transferred off to the right, as indicated by the arrow 48. Another block 10 is loaded onto the cradle 40 from the left as indicated by the arrow 50. This loading and unloading of the cradle in the bottom position is accomplished by means of the transfer mechanism 16. Then the cradle 24 rotates a quarter turn, and the process is repeated again, with the block in the cradle 46 being unloaded, and another being loaded, and so forth.

These four cradles 40, 42, 44, and 46 are identical. For example, considering the cradle 40 in detail, it is seen to include a front and a rear end ring 52 and 54, each having a generally Y-shaped opening for accommodating an engine block as seen in elevation in end view. As is understood in the automobile industry, the two upper branches of the Y configuration are formed by the two banks of cylinders, and the bottom part or stem of the Y configuration is formed by the lower portion of the engine block which includes the pan rail for supporting the crankcase pan and the crankshaft bearings.

Extending between the end rings 52 and 54 are a pair of short track segments 56. These track segments align with the main track 12 extending through the machine when each of the cradles is in its lower position ready to discharge and receive respective blocks. Also, extending between these end rings and holding them in properly spaced relationship are a pair of guide bars 58. These guide bars 58 are positioned so as to leave a slight amount of clearance over the tops of the banks of cylinders when the blocks are slid into and removed from the cradle 40. The guide bars 58 support the engine blocks 10 when they are in their inverted positions, as shown at the left and right in Figure 1, that is, when in the positions now occupied by the cradles 42 and 46.

In order to provide clearance for the transfer dog 18 to engage the lower end of the respective engine blocks, for loading and unloading of the cradles, the end rings 52 and 54 are slotted at 60, as seen most clearly in Figure 2. These end rings fit into respective ones of four circular openings 62 in the two main end plates 28 and 30, and there is a slot 64 extending between each opening 62 and the perimeter of the end plate, as seen in Figure 2. In the lower position where the blocks are loaded and unloaded from the track 12, the slots 60 in the end rings and 64 in the end plates, align with one another as shown in Figures 1 and 2, providing a passageway for the dog 18.

Supporting each of the end rings 52 and 54 in each of the openings 62 are ten small rollers 66, 67, 68, 69, 70 and 72. Two pairs of these rollers are carried in cutout recesses in the end plates 28 and 30 adjacent to opposite sides of the slot 64. The other pairs of rollers 70 and 72 are similarly mounted near the side of the circular opening 62 and opposite to the slot 64. These ten rollers are journaled on short shafts such as the shaft 74 shown in Figure 4 extending between two pairs of brackets 76 bolted against opposite faces of the end plates 28 and 30. In order to guide the end rings and hold them in position the upper ends of five of these brackets 76 overlap the rim of the end rings 52, as seen in Figures 2, 3, and 4.

To rotate the cradles 40, 42, 44 and 46 as the turret assembly is revolved around the main shaft 26, an annular sun gear 80 (see Figures 1 and 5) is supported from frame brackets 36 and 37 by means of four stub shafts 82. This gear 80 remains stationary, and it is engaged by four compound idler gears supported on stub shafts 86 equally spaced around the main shaft 26. These stub shafts are secured to the end plate 28 between the four circular openings 62. These compound idlers (see also Figure 6) each include a gear 83 of small diameter engaging the gear 80 and a larger gear 84 engaging annular gears 88 rigidly fixed to the end rings 52 by means of three short stub shafts 90 seen in section in Figure 2. As the turret assembly revolves counterclockwise in the direction of the arrow 93, in Figure 1, the idler gears 83 roll along the gear 80 and are rotated counterclockwise in the directions of the arrows as shown thereon. The larger gears 84 drive the annular gears 88 and thus they act to turn the four cradles 40, 42, 44 and 46 in the clockwise direction, as shown. The relative diameters of the gears 80, 83, 84, and 88 provide an effective three-to-one gear ratio between the gears 80 and 88 so that, advantageously, these cradles make two complete rotations clockwise with respect to the machine frame as they revolve around with the turret assembly while it makes one complete revolution counterclockwise with respect to the machine frame.

These ring gears 88 all include slots aligned with the slot 60 in the end rings 52, thus providing clearance for the clutch dogs 18, as will be understood.

Among the advantages of using the four compound idler gears 84 positioned as shown are those resulting from the fact that they each engage two of the ring gears 88. As these slots in the ring gears 88 pass one or the other of the two idler gears 84 engaging it, the other idler gear is in firm engagement with a continuous place on the ring gear, thus assuring a continual and positive driving relationship for the cradles at all times in spite of the gaps in the annular gears 88.

With this arrangement, when the cradle 40 has been moved up to the right side position, now shown as occupied by the cradle 42, that is, a quarter revolution, the engine block 10 is inverted and is positioned out to one side of the main shaft 26 where it is readily accessible to various high pressure cleansing sprays. For example, high pressure jets 91 are shown directed upwardly from below the block and directed into the cylinder openings which are now facing downwardly. Thus, any soil material is effectively flushed out of the block. Other soil material and liquid tumbles out as the block is turned into this inverted position.

When the turret assembly is advanced another quarter revolution, so that the cradle 40 is now up in the top position, now shown as occupied by the cradle 44, the engine block is again in its initial position, having completed one rotation about its axis.

In the three-quarter position, out to the left of the main shaft, which is now shown in Figure 1 as occupied by the cradle 46, the engine block 10 is inverted a second time and can readily be subjected again to suitable high pressure jets for washing or drying action, as the case may be. This second inversion again provides opportunity for any small bits of remaining soil material or liquid to dump out of the top of the block as it is being inverted and gradually rolls into upright position again at the bottom.

The turret assembly 24 revolves a quarter turn each time it moves, pausing at the four positions shown in Figure 1, and in each of these four positions is subjected to a brief high pressure jet of washing liquid, or hot air, from a plurality of spray nozzles, not shown, positioned at the most effective locations around the turret assembly. Other spray nozzles intermediate the four pausing positions of the cradles serve to wash off the exterior and interior passages of the blocks as the turret is being turned between these four positions. As a result of this independent rotation of the engine blocks while they are being revolved in the turret, a more effective cleansing action is obtained and a more thorough internal cleaning of the solid particles from the intricate passages within the engine blocks is assured.

Among the many further advantages of this turret assembly 24 are those resulting from the fact that blocks can be loaded into it and removed from it at other positions than the lower one. Moreover, the turret can be used advantageously for combined functions, such as to wash the blocks and also to elevate them and deliver them to other parts of the washing machine, conveniently at different elevations, where desired. For example, as shown in Figure 5, there are upper sections of track 12A and 12B which align with the track segments 56 of the cradle which is in the top position. A first reciprocating transfer plunger 92 is hydraulically actuated and unloads selected blocks 10 from the top cradle onto the tracks 12B so that they can be sent through the machine to a different destination from those blocks which continue on down to the bottom position. Suitable hydraulic mechanism for actuating the reciprocating plunger 92 is disclosed and claimed in the above-identified copending applications. When the block is to remain in the top cradle, the transfer plunger 92 is withdrawn into inoperative position and swung laterally off to one side where it is clear of the tracks 12A, thus allowing any blocks to be moved along the track 12A. When it is to be used again, the plunger 92 is swung back into position opposite the top cradle where it can be utilized as needed.

In certain assembly lines the turret mechanism 24 is adapted to wash blocks both before and after the bearing caps have been bolted in place. Before this operation the blocks require a thorough washing operation and pass through the machine in the normal way, being twice inverted in the turret 24.

After the bearing caps have been fastened on, the blocks do not require such a thorough cleansing operation, and it is desired to send them along the track 12B for further assembly operations. The transfer plunger 92 is used to unload from the top cradle all of the blocks which have had their bearing caps installed.

A second transfer plunger 94 is available to be swung into place over the track 12B where it is in position ready to unload blocks from the top cradle and slide them to the left along the track 12A. Thus, in the top position blocks can be loaded into a cradle from either track 12A or 12B and can be unloaded from a cradle onto either track 12A or 12B as production schedules may require. This is a great convenience in use.

The turret apparatus shown somewhat schematically in Figure 7 is generally similar to that of Figures 1-6 and parts performing corresponding functions have corresponding reference numbers. The differences between these two turrets and the features shown in Figure 7 are described hereinafter, and it is believed that the somewhat simplified or schematic illustration of Figure 7 emphasizes these differences and features and aids in their quick understanding more than a completely detailed illustration.

In order to rotate the four cradles 40, 42, 44, and 46 in the same direction as the turret 24A, four pairs of idler gears 102 and 104 are used. The idlers 104 are rotatably mounted on the end plate 28 between respective annular gears 88. The axes of the four gears 104 are approximately the same distance from the center of the main shaft 26 as are the axes of the annular gears 88. Each gear 104 engages two of the annular gears 88.

The four smaller idlers 102 each engage the fixed annual sun gear 80 and also the idlers 104. The sun gear 80 and the annular gears 88 have the same diameter, that is, a one-to-one gear ratio is provided between gear 80 and gears 88. Thus, advantageously the cradles turn once with respect to the turret while the turret turns once in the same direction with respect to the machine frame. In other words, the cradles turn over twice with respect to the machine frame while the turret turns once.

Because each of the cradles is driven by two idlers 104, a continuous drive is obtained in spite of the gaps in the gears 88, as explained above.

In the illustrative embodiment of the cradle apparatus 24B shown somewhat schematically or simplified in Figures 8 and 9, continuous effective driving of the annular cradle gears 88 is obtained by means of a chain 110 which is festooned around four gears 112, 114, 116, and 118. This cradle apparatus 24B is generally similar to the cradle apparatus 24 shown in Figures 1–6 and parts performing corresponding functions have corresponding reference numbers. Three of these chain-supporting gears 114, 116 and 118 are identical and are rotatably mounted on the end plate 28 mid-way between respective ones of the annular cradle gears 88 with their axes at the same distance from the main shaft 26 as the axes of the cradles. These three gears 114, 116, and 118 are just small enough that their teeth clear the teeth of the gears 88.

In order to drive the chain 110, the fourth gear 112 is somewhat smaller than the other three and is positioned closer to the shaft 26 so as to be engaged by an idler gear 120 which engages a rotatable sun gear 122. This sun gear is mounted on a collar 124 (see also Figure 9) surrounding the main shaft and is turned by a gear 126 driven by a gear 128 secured to a shaft 130. The shaft 130 is journaled in a bearing 132 fastened to the underside of a main frame member 136 beneath the main shaft bearing 32.

This shaft 130 is turned in the same direction as the main shaft 26 and is moved and stopped in synchronism therewith. In other words, as the cradle 40 is being moved up a quarter turn to the position now occupied by the cradle 42, the sun gear 122 is rotated in the opposite direction, causing the cradles to turn in the same direction as the turret except at a faster rate. When the turret is stopped after a quarter turn, the sun gear 122 also is stopped.

By driving the sun gear 122 a greater flexibility in operation is obtained. For example, it usually is desirable to turn the cradles 90° with respect to the turret while the turret turns 90° with respect to the machine frame. In this way the cradles turn over twice with respect to the machine frame as the turret turns once.

When extensive tumbling action is desired between each of the four stationary positions the cradles are turned one complete rotation plus 90° (i. e. 450°) with respect to the turret while the turret turns 90° with respect to the machine frame. In this way the cradles are rotated one and one-half turns (i. e. 540°) with respect to the machine frame between each of the four stationary positions, making a total of six turns for each revolution of the turret 24B.

One convenient way of obtaining the desired synchronism between the shafts 26 and 130 is to drive the shaft 130 through a suitable gear train from the shaft 26, as will be understood from the above description.

Turning back to Figures 1 and 7, the sun gears 80 are described as being stationary, and this is the preferred arrangement for most installations as providing easier maintenance and control. However, where greater flexibility or adjustment in relative cradle speed is required, then sun gear is mounted on and driven by a collar around the main shaft, similar to the arrangement of the collar 124 in Figure 9, as will be understood from the above specification.

From the foregoing description it will be understood that the improved turret assembly apparatus of the present invention is well adapted to provide the many advantages discussed above, and that this improved turret assembly can be adapted for a wide variety of industrial washing and cleansing operations suited for use with many different types of manufactured articles and that various changes or modifications may be made therein each as may be best suited to a particular application, and that the scope of the present invention, as defined by the following claims is intended to include such modifications or adaptations limited only by the prior art.

I claim:

1. In power washing apparatus, an improved turret assembly comprising a turret frame, first bearing means supporting the turret frame for rotation about an axis extending centrally through the frame, a plurality of cradles positioned at intervals around the periphery of the turret frame, second bearing means supporting each of said cradles individually in the turret frame for rotation about its own axis within the turret frame, positive drive means coupled to each of the cradles and adapted to rotate each cradle with respect to the turret frame, said cradles having clearance openings at opposite ends adapted for the loading and unloading of articles therein, and guiding and supporting means within the cradles adapted to guide and support articles therein in position to rotate with the cradles and to revolve with the turret.

2. In power washing apparatus, an improved turret assembly comprising a turret frame, first bearing means supporting the turret frame for rotation about a central axis, a plurality of spaced cradles positioned in the turret frame and spaced at intervals around its central axis, second bearing means supporting each of said cradles in the turret frame for individual rotation independently of motion of the turret frame, gear drive means coupled to each of the cradles and adapted to rotate each cradle in the turret frame, said turret frame having clearance openings therein, said cradles having predetermined clearance openings adapted to align with the openings in the turret frame when the cradles are in a predetermined position for the loading and unloading of articles in the cradle so aligned, and guiding and supporting means within the cradles adapted to guide and support articles therein in position to rotate with the cradle and to revolve with the turret frame.

3. In power washing apparatus, an improved turret assembly comprising a turret frame, first bearing means supporting the turret frame for rotation about a central axis, a plurality of cradles in the turret frame positioned at intervals around said central axis of the turret frame, second bearing means supporting each of said cradles in the turret frame for rotation about its own axis within the turret frame, each turret including a pair of spaced ends having axial clearance openings therethrough for the loading and unloading of articles therein, an annular gear coupled to each of the cradles, a main drive gear located concentrically with the central axis of the turret frame arranged to drive the annular gears on the cradles to rotate the cradles independently of the turret frame, and guiding and supporting means within each cradle extending between its spaced ends and adapted to guide and support articles therein in position to rotate and revolve with the cradles.

4. In power washing apparatus, an improved turret assembly comprising a main shaft, a pair of end turret plates secured to said shaft at two points spaced apart along its length, first bearing means supporting the main shaft for rotation about its axis, each of said end plates having a plurality of openings therein, the respective openings in each end plate being axially aligned with one another, a plurality of cradles supported in said turret assembly between said end plates and aligned with the openings in said end plates, said cradles having openings in their ends aligned with the openings in said turret end plates for loading and unloading articles therethrough, bearing means supporting said cradles in said turret assembly for rotation about their individual axes, and gear means rigidly secured to each of said cradles and adapted to rotate said cradles within said turret assembly.

5. In power washing apparatus, an improved turret assembly comprising a main shaft, a pair of end turret plates spaced apart and secured to said shaft, first bearing means supporting the main shaft for rotation about its axis, each of said end turret plates having a plurality of circular openings therein, the respective openings in each end turret plate being aligned with one another, a plurality of cradles supported in said turret assembly each including a pair of end rings spaced apart the same distance as said end turret plates, said end rings being positioned in respective aligned circular openings in the end turret plates, and rigid members extending between the end rings of each cradle, second bearing means supporting said end rings in said circular openings for rotation about their individual axes, and annular gear means rigidly secured to one of the end rings of each of said cradles and adapted to rotate each cradle within said turret assembly.

6. In power washing apparatus, an improved turret assembly comprising a main shaft, a pair of end turret plates spaced apart and secured to said shaft, first bearing means supporting the main shaft for rotation about its axis, each of said end turret plates having a plurality of generally circular openings therein, the respective openings in each end turret plate being axially aligned with one another, a plurality of cradles supported in said turret assembly each including a pair of end rings spaced apart the same distance as said end turret plates, said end rings fittting closely within said generally circular openings, and rigid members extending between the end rings of each cradle, said end turret plates including recessed areas adjacent to said generally circular openings, and second bearing means positioned within said recessed areas and supporting said end rings in said generally circular openings for rotation about their individual axes, annular gear means rigidly secured to one of the end rings of each of said cradles, and a main gear concentric with said main shaft adapted to drive said annular gears to rotate said cradles in the turret assembly during revolution of said turret assembly.

7. In power washing apparatus, an improved turret assembly comprising a main shaft, bearing means supporting said main shaft for rotation about its axis, a pair of spaced end plates secured to said main shaft, said end plates having a generally circular periphery, each end plate having a plurality of openings therein uniformly spaced around said shaft, the respective openings in each end plate being axially aligned with one another, at least one end plate including slots communicating with its openings and extending out to the periphery of said end plate, a plurality of cradles in said turret assembly, each of said cradles including a pair of generally circular end rings positioned in the respective opposed openings in said turret end plates, at least one of the end rings of each pair having slots therein extending between their periphery and an internal opening therein, each of said cradles including brackets extending between the respective pairs of end rings and supporting them in spaced relationship and adapted to receive and support the articles to be washed therein, an annular gear rigidly secured to one of the end rings of each of said cradles, a sun gear rigidly secured to the frame of the machine and concentric with said main shaft, and a plurality of idler gears engaging said sun gear and said annular gears, at least two idler gears engaging each of said annular gears on the cradles.

8. In power washing apparatus, an improved turret assembly comprising a main shaft, bearing means supporting said main shaft for rotation about its axis, a pair of spaced end plates secured to said main shaft, said end plates having a generally circular periphery, each end plate having a plurality of openings therein uniformly spaced around said shaft and including slots communicating with said openings and extending out to the periphery of said end plates, the respective openings and slots in each end plate being axially aligned with one another, a plurality of cradles in said turret assembly, each of said cradles including a pair of generally circular end rings positioned in the respective openings in said turret end plates, said end rings having slots therein extending between their periphery and an internal opening therein, each of said cradles including brackets extending between the respective pairs of end rings and supporting them in spaced relationship and adapted to receive and support the articles to be washed therein, an annular gear rigidly secured to one of the end rings of each of said cradles, said annular gears having slots therein aligned with the slots in their respective associated end rings, a main driving gear concentric with the main shaft, and a plurality of idler gears engaging said main driving gear and said annular gears, at least two idler gears engaging each of said annular gears on the cradles.

9. In power washing apparatus, an improved turret assembly comprising a turret frame, first bearing means supporting the turret frame for rotation about an axis extending centrally through the frame, a plurality of cradles positioned at intervals around the periphery of the turret frame, second bearing means supporting each of said cradles individually in the turret frame for rotation about it own axis within the turret frame, said cradles having clearance openings at opposite ends adapted for the loading and unloading of articles therein, guiding and supporting means within the cradles adapted to guide and support articles therein in position to rotate with the cradles and to revolve with the turret, an annular gear secured to each cradle around said clearance openings, a sun gear having its axis concentric with the axis of the turret frame, and a plurality of compound idler gears mounted on said turret frame, one between each of said annular gears, said compound idler gears having smaller diameter gears engaging said sun gear and larger diameter gears engaging the two adjacent annular gears.

10. In power washing apparatus, an improved turret assembly comprising a turret frame, first bearing means supporting the turret frame for rotation about an axis extending centrally through the frame, a plurality of cradles positioned at intervals around the periphery of the turret frame, second bearing means supporting each of said cradles individually in the turret frame for rotation about its own axis within the turret frame, said cradles having clearance openings at opposite ends adapted for the loading and unloading of articles therein, guiding and supporting means within the cradles adapted to guide and support articles therein in position to rotate with the cradles and to revolve with the turret, an annular gear secured to each cradle around said clearance openings, a central gear concentric with the axis of said turret frame, and a plurality of pairs of intermeshing idler gears rotatably mounted on said turret frame, each pair being generally between adjacent annular gears, one of the idler gears of each intermeshing pair engaging the two adjacent annular gears, the other idler gear of each intermeshing pair engaging the central gear.

11. In power washing apparatus, an improved turret assembly comprising a turret frame, first bearing means supporting the turret frame for rotation about an axis extending centrally through the frame, a plurality of cradles positioned at intervals around the periphery of the turret frame, second bearing means supporting each of said cradles individually in the turret frame for rotation about its own axis within the turret frame, said cradles having clearance openings at opposite ends adapted for the loading and unloading of articles therein, guiding and supporting means within the cradles adapted to guide and support articles therein in position to rotate with the cradles and to revolve with the turret, an annular gear fixedly secured to each cradle and being generally concentric with the clearance opening of the respective cradle to which it is secured, a central gear concentric with the axis of the turret frame, a plurality of pairs of chain-supporting idler gears rotatably mounted on said turret assembly, one being between each adjacent pair of said annular gears, and a chain festooned out around each of said idler gears and in around each of said annular gears, said central gear driving said chain when said turret frame is revolved.

12. An improved turret assembly as claimed in claim 14 wherein an additional idler gear is rotatably mounted on said turret between said central gear and one of said chain-supporting idler gears and interengages them, and said central gear is driven by a collar rotatably mounted in the power washer concentric around the turret axis.

13. In power washing apparatus, an improved turret assembly comprising a turret frame, first bearing means supporting the turret frame for rotation about an axis extending centrally through the frame, a plurality of cradles positioned at intervals around the periphery of the turret frame, second bearing means supporting each of said cradles individually in the turret frame for rotation about its own axis within the turret frame, positive drive means coupled to each of the cradles and adapted to rotate each cradle with respect to the turret frame, said cradles having clearance openings at opposite ends adapted for the loading and unloading of articles therein, guiding and supporting means within the cradles adapted to guide and support articles therein in position to rotate and revolve with the cradles, and track means defining first and second tracks each parallel with the axis of the turret frame and at opposite ends of the turret frame, said first and second tracks being offset from one another at different positions with respect to the periphery of the turret frame, said first and second tracks being aligned with the clearance openings at the opposite ends of respective cradles at predetermined angular positions of the turret frame.

14. In a power washer as claimed in claim 13, first and second transfer mechanisms associated with said first and second tracks, respectively, for loading articles from said first track into a cradle through a clearance opening at one end of said cradle, and subsequently for unloading articles from said cradle onto said second track through the clearance opening at the opposite end of said cradle.

References Cited in the file of this patent

UNITED STATES PATENTS

| | | |
|---|---|---|
| 97,688 | Pfeiffer | Dec. 7, 1869 |
| 243,662 | Wagner | June 28, 1881 |
| 401,039 | Lee | Apr. 9, 1889 |
| 2,578,733 | Nordquist | Dec. 18, 1951 |